United States Patent

Meyr

[11] 3,804,518
[45] Apr. 16, 1974

[54] MEASUREMENT OF THE VELOCITY OF A BODY

[75] Inventor: Heini Meyr, Hinterkappelen, Switzerland

[73] Assignee: Hasler AG, Berne, Switzerland

[22] Filed: May 1, 1972

[21] Appl. No.: 249,235

[30] Foreign Application Priority Data
May 5, 1971  Switzerland.......................... 6677/71

[52] U.S. Cl. ................................. 356/28, 324/175
[51] Int. Cl. ............................................. G01p 3/36
[58] Field of Search ............. 324/175, 160; 356/28; 235/150.34

[56] References Cited
UNITED STATES PATENTS
3,689,157  9/1972  Andermo........................ 324/175 X
FOREIGN PATENTS OR APPLICATIONS
964,581  7/1964  Great Britain...................... 324/175

Primary Examiner—Alfred E. Smith
Assistant Examiner—Rolf Hille
Attorney, Agent, or Firm—Brady, O'Boyle & Gates

[57] ABSTRACT

A device for a moving body, to measure the speed of the moving body over a surface having local irregular features, having sources to illuminate local areas of the surface under a leading and a trailing photo-electric converter on the moving body which produce two sequences of electrical signals which correspond to the irregular feature of the surface at two points running in common with the body, that are spaced one from the other in the direction of movement. A delay unit with an adjustable delay for the signal output of the leading converter, a multiplication circuit for multiplying the delayed signals of the leading converter by the undelayed signals of the trailing converter, a low pass filter connected to the output of the multiplication circuit, a control circuit for adjusting the delay of the delay unit to a value which corresponds to a timely coincidence of the two consecutive signals obtained from the same point at the two inputs to the multiplication circuit, and an indicating device which on the basis of the delay time and the spacing of the two points indicates at any time the relative velocity of the moving body, so characterized that a filter is interposed in the connection between each photo-electric converter and the multiplication circuit, the frequency characteristics of which are different and so chosen that the valves obtained at the output of the low pass filter go through zero, when the delay time of the delay unit is equal to the time required to cover the said distance at the instant of the measurement.

7 Claims, 9 Drawing Figures

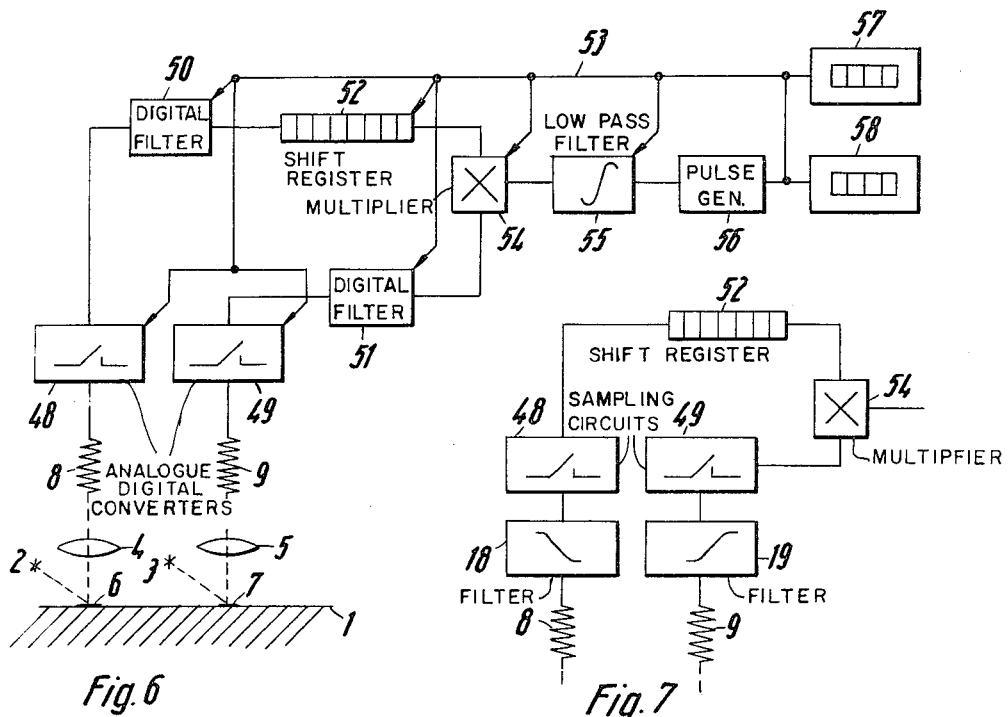
Fig. 6
Fig. 7
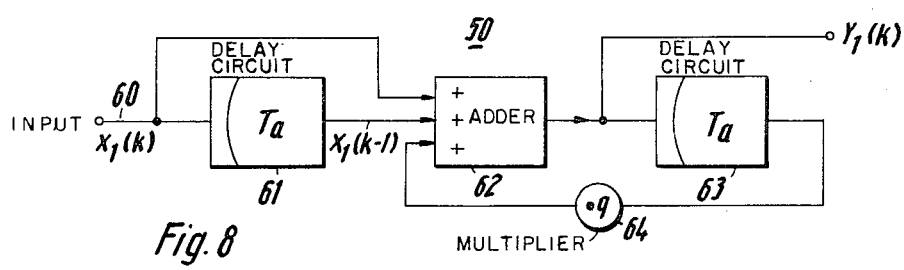
Fig. 8
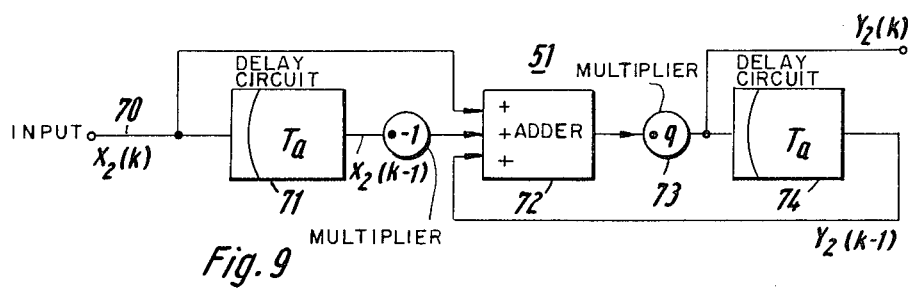
Fig. 9

MEASUREMENT OF THE VELOCITY OF A BODY

The invention relates to a device for the measurement of the velocity of a body which is moving parallel to a surface that has a local irregular feature. This device has a leading and a trailing converter for the production of two sequences of electrical signals which correspond with the feature of the surface at two points running in common with the body, that are spaced out one from the other in the direction of movement, a delaying device with an adjustable delay for the quantities emanating from the leading converter, a multiplication circuit for the multiplication of the delayed quantities of the leading converter with the underlayed quantities of the trailing converter, a low pass filter connected to the output of the multiplication circuit, a control circuit for the adjustment of the delay of the delay unit to a value which corresponds to a time-based coincidence of the two quantities obtained one after the other from the same location on the surface at the two inputs of the multiplication circuit, and at least one indication device which shows on the basis of the delay period and the distance of the points the relative velocity at any time and/or the path travelled from a given point onwards.

A measuring device of this kind is described in British Patent Specification 964,581. It incorporates two photo-electric converters for the conversion of the irregularities of the surface into corresponding electrical values, which yield a voltage corresponding to the reflective capacities of the surfaces illuminated. A continuously rotating magnetic tape or a magnetic drum with a scribing head and a reading head in the same track serves for the delay function.

To alter the delay, either the spacing between the two heads or the speed of the magnetic information carrier is changed. When the running time of the magnetic information carrier between the said heads is equal to the travel time of a point on the surface between the two pick-ups, there results a maximum signal at the output of the low pass filter. With the help of a control circuit, a regulating device adjusts the working point of the device to this maximum.

It is however preferable not to regulate on a maximum, but on a zero throughput of the output signal of the low pass filter. For this purpose in accordance with the said patent specification, the signal from the leading pick-up was delayed by two different times differing slightly one from the other, each of the two delayed signals multiplied by the signal of the trailing pick-up and the difference of the signals depicted which emerge at the output of the low pass connected after the multiplication circuit, and the delay so adjusted that this difference became zero.

According to copending U.S. Pat. application Ser. No. 249,084 of H. Meyr and R, Kuhne, filed May 1, 1972, a delaying device without moving parts is employed, namely a shift register. In this arrangement two electrical impulse sequences of equal and variable frequency are produced, the amplitudes of which are altered correspondingly to the alterations of the feature at each one of the points on the surface. The impulse sequence obtained from the leading point is delayed in inverse proportion to the frequency, the delayed impulse and the impulse of the other impulse sequence are thereafter multiplied together as a pair and the frequency of the impulse sequences is altered in such a way that the mean time value of the product assumes the value which corresponds to a time-based coincidence of the two quantities obtained one after the other from the same location on the surface at the two inputs of the multiplication circuit.

In a first form of embodiment of the device according to this proposal regulation is on the maximum at the output of the low pass filter. This requires a costly maximum-seeking regulating device and only leads to a correct regulation if the governing characteristic is symmetrical in the vicinity of the maximum. In a second form of embodiment according to this proposal regulation is on the zero throughput of the output quantity of the low pass filter. This version has a delay device with two outputs for two delay times slightly differing from one another, through which two circuits are necessary for multiplication and two low passes.

A device in accordance with the present invention is considerably more simple, and is characterized by the fact that a filter is incorporated into the connection between each converter and the multiplication circuit, the frequency characteristics of which are different and so chosen that the value obtained at the output of the low pass passes through zero when the delay time of the delay circuit is equal to the time required for passing through the said distance at the instant of the measurement.

The filters can work with either continuous or discrete values.

For continuous values the two filters are preferably so disposed that the Fourier-transformed $H_1(\omega)$ and $H_2(\omega)$ respectively of the impulse response satisfies the following equation:

$$\overline{H_1}(\omega) \cdot H_2(\omega) = -\overline{H_1}(-\omega) \cdot H_2(-\omega) \qquad (1)$$

in which $\overline{H_1}(\omega)$ is the conjugate complex function to $H_1$ and $\omega$ is the angular frequency.

For discrete values a sampling device may be located between each energy converter and the associated filter, which converts the continuous voltage obtained at the outputs of the energy converters into discrete voltage values. These can be further converted in the analogue/digital converter into digital values, which are in particular expressed through binary codes. The filters are then selected for discrete values and their Z-transformations of the impulse response $H_1(z)$ and $H_2(z)$ respectively are so selected that they satisfy the following equation:

$$H_1(z) \cdot H_2(1/z) = -H_1(1/z) \cdot H_2(z) \qquad (2)$$

in which $z = e^{-sT_a}$ and $s$ in the quantity $\sigma + jw$ of the Laplace transformation and $T_a$ is the sampling interval.

In order that the present invention be more readily understood embodiments thereof will now be described, by way of example, with reference to the accompanying drawings, in which:

FIG. 6 shows a schematic-block diagram of a speed-measurement device in which the values are present in discrete form;

FIG. 7 shows a different form of the circuit shown in FIG. 6; and

FIGS. 8 and 9 illustrate schematic diagrams of two filter circuits for discrete values.

Figure 1:
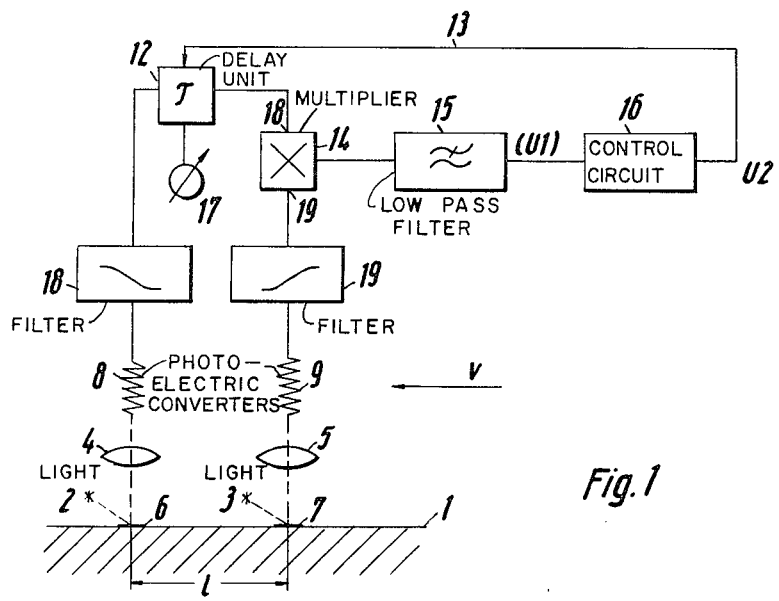
FIG. 1 shows a schematic block diagram of a speed-measurement device in which the values are present as continuous analogue quantities.

FIG. 1 shows a schematic block circuit diagram of a measurement device as it is provided for example for the measurement of the speed of a railway vehicle. Reference numeral 1 represents the surface of the rail, while the whole of the remaining apparatus is located on the vehicle and is moved with this from right to left with a velocity $v$, while light sources 2 and 3 illuminate the rail surface 1. Two illuminated points 6 and 7 are viewed through the optical systems 4 and 5 respectively on photo-electric converters 8 and 9 respectively, for example photo-diodes. Voltages of the character of noise result at the outputs of the photo-electric converters which are dependent upon the optical characteristics of the flat track sensed. Since the points 6 and 7 lie on the same track, the voltage cycle at the outputs of the two photo-electric converters is approximately equal, but the voltage at the output of the trailing converter lags the voltage at the output of the leading converter by the time T which the vehicle takes to cover a path $l$ equal to the spacing of the points on the surface 6 and 7.

Two filters 18 and 19 are provided of different frequency characteristics together with a delay unit 12 which retards the signal emitted from the output of the filter 18 by a time $\tau$. This time can be altered by a control voltage from a lead 13. The values at the outputs of the filter 19 and the delay unit 12 are multiplied together in a multiplier 14. A signal results at the output of this circuit which is proportional to the product of the values at its two inputs, and which is fed to a low pass filter 15, and a control circuit 16, to the output of which the lead 13 already referred to is connected.

Figure 2:
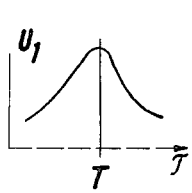
FIGS. 2 and 3 show two curves for the values at the output of a low pass filter contained in FIG. 1.

If the filters 18 and 19 were not present, then the voltage at the output of the low pass filter 15 constitutes the cross-correlation function of the functions depicted through the voltage of the photo-electric converter 9 and through the voltage retarded by the delay unit 12 at the output of the photo-electric converter 8. It is well known that this cross correlation function then has a maximum (FIG. 2) when the delay time $\tau$ is equal to the travel time T of the measurement device for the distance $l$ of the points 6 and 7, that is, for $\tau = T = l/v$.

Figure 3:
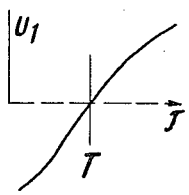

Through the introduction of the filters 18 and 19 however, there is obtained a relationship of the voltage $U_1$ at the output of the low pass filter 15 to the delay time according to FIG. 3.

It can be shown by calculation that the characteristic according to FIG. 3 occurs when the filters 18 and 19 have different characteristics, in such a way that their Fourier transforms of the impulse response $H_1(\omega)$ and $H_2(\omega)$ respectively satisfy the following equation:

$$\overline{H_1}(\omega) \cdot H_2(\omega) = -\overline{H_1}(-\omega) \cdot H_2(-\omega), \quad (1)$$

in which $\overline{H_1}(\omega)$ is the conjugate complex Fourier transform of the impulse response of the filter 19. $H_1$ and $H_2$ are complex functions.

To show this, we refer to the input voltages $x_1(t)$ and $x_2(t-T)$ and the output voltages $y_1(t)$ and $y_2(t-T)$ of the filters 18 and 19 respectively, and to the input voltages $y_I(t-\tau)$ and $y_{II}(t-T) = Y_1(t-T)$ of the multiplier 14.

We want to find filters 18 and 19, having such characteristics that the voltage $U_1$ versus $\tau$ has the function shown in FIG. 3.

The power spectrum of $U_1$ is equal to the cross power spectrum of the two stochastic signals $y_I(t-\tau)$ and $y_{II}(t-T)$, which, according to Papoulis, Random Variables and Stochastic Processes, McGraw Hill, New York 1965, p. 353, is given by $$S y_I, y_{II}(\omega) = \overline{H_1}(\omega) \cdot H_2(\omega) \cdot S w_1, x_2(\omega) \quad (3)$$

wherein $\overline{H_1}(\omega)$ is the conjugate complex of the Fourier transform of the response of filter 18 and $H_2(\omega)$ is the Fourier transform of the impulse response of filter 19.

According to a well known Theorem of Wiener, (A. Papoulis, Probability, Random Variables and Stochastic Processes, McGraw-Hill, New York, 1965, p. 338, section 10.2) the correlation of the two signals $y_I(t-\tau)$ and $y_{II}(t-T)$ is the Fourier transform of the power spectrum $$R y_I, y_{II}(\tau - T) = \frac{1}{2\pi} \int_{-\infty}^{\infty} \overline{H_1}(\omega) \cdot H_2(\omega) \cdot S x_1, x_2(\omega) e^{-j\omega(\tau-T)} d\omega \quad (4)$$

The problem can now be stated mathematically as follows: What are the conditions on $\overline{H_1}(\omega) \cdot H_2(\omega)$ in order to have an odd symmetry in $R y_I, y_{II}(\tau-T)$, i.e.

$$R y_I, y_{II}(T-\tau) = -R y_I, y_{II}(\tau-T) \quad (5)$$

Theorem: Necessary and sufficient for $R y_I, y_{II}(\tau-T)$ to have odd symmetry is for the real part $Re$ $$Re\,[\overline{H_1}(\omega) \cdot H_2(\omega)] = 0 \quad (6)$$

and for the imaginary part $Im$ $$Im\,[\overline{H_1}(\omega) \cdot H_2(\omega)] = -Im\,[\overline{H_1}(-\omega) \cdot H_2(-\omega)] \quad (7)$$

or equivalently $$\overline{H_1}(\omega) \cdot H_2(\omega) = -\overline{H_1}(-\omega) \cdot H_2(-\omega) \quad (8)$$

Proof: The complex function $\overline{H_1}(\omega) \cdot H_2(\omega)$ can be written as $$\overline{H_1}(\omega) \cdot H_2(\omega) = Re\,[\overline{H_1}(\omega) \cdot H_2(\omega)] + j \cdot Im\,[\overline{H_1}(\omega) \cdot H_2(\omega)] \quad (9)$$

and $$e^{j\omega(\tau-T)} = \cos[\omega(\tau-T)] + j\sin[\omega(\tau-T)] \quad (10)$$

Using these relations, the integral (2) can be rewritten as $$Ry_I, y_{II}(\tau-T) = \frac{1}{2\pi} \cdot \begin{Bmatrix} \int_{-\infty}^{\infty} Re[\overline{H_1}(\omega) \cdot H_2(\omega)] \cdot \cos[\omega(\tau-T)] d\omega \\ -\int_{-\infty}^{\infty} Im[\overline{H_1}(\omega) \cdot H_2(\omega)] \cdot \sin[\omega(\tau-T)] d\omega \\ +j\int_{-\infty}^{\infty} Re[\overline{H_1}(\omega) \cdot H_2(\omega)] \cdot \sin[\omega(\tau-T)] d\omega \\ +j\int_{-\infty}^{\infty} Im[\overline{H_1}(\omega) \cdot H_2(\omega)] \cdot \cos[\omega(\tau-T)] d\omega \end{Bmatrix}$$

(11)

Since $Ry_I,y_{II}$ ($\tau$–$T$) must be a real valued function, this implies $$Re\,[\overline{H_1}\,(\omega) \cdot H_2\,(\omega)\,] = Re\,[\overline{H_1}\,(-\omega) \cdot H_2\,(-\omega)] \quad (12)$$

and $$Im\,[\overline{H_1}\,(\omega) \cdot H_2\,(\omega)\,] = -\,Im\,[\overline{H_1}\,(-\omega)\,] \quad (13)$$

The condition $$Ry_I,y_{II}\,(\tau-T) = -\,Ry_I,y_{II}\,(T-\tau) \quad (5)$$

can than according to equation (11) only be fulfilled if $$Re\,[\overline{H_1}\,(\omega) \cdot H_2\,(\omega)\,] = 0 \quad (6)$$

holds.

The proof for the relation $$H_1\,(z) \cdot H_2\,(1/z) = -\,H_1\,(1/z) \cdot H_2\,(z) \quad (2)$$

is based on similar reasons.

A pair of filters which satisfies the said condition has the following Fourier transformations of the impulse responses:

$$H_1\,(\omega) = 1/1 + j\omega RC \quad (14)$$

and $$H_2\,(\omega) = j\,\omega RC/1 + j\omega RC \quad (15)$$

wherein $RC$ is a time constant.

Figure 4:
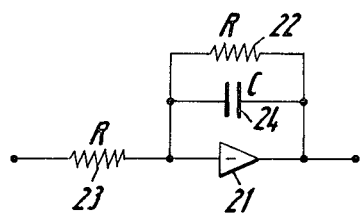
FIGS. 4 and 5 show electrical schematic diagrams of two filter circuits.
Figure 5:
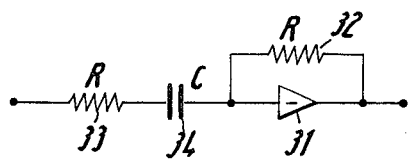

Two circuits which satisfy these equations are shown in FIGS. 4 and 5. In these circuits 21 and 31 are operational amplifiers, that is, broad band inversion amplifiers with a high degree of amplification, 22 and 32 are resistances with the resistance value R which respectively join output and input of an amplifier together and 23 and 33 are resistances with the same resistance value R, which each lie between the input of the filter and the input of the operational amplifier concerned. If the resistances 23 and 33 respectively are not equal to R, but equal to $\alpha R$, then the amplification only is altered in the ratio $1/\alpha$. It is of no significance which of the two filter circuits is installed as the filter 18 and which as the filter 19.

The incorporation of the two filters 18 and 19 has the effect that for the case $\tau = T$ the voltage at the output of the low pass filter 15 is equal to zero and that for $\tau > T$ it takes the opposite polarity to that for $\tau < T$. Consequently the control circuit is to be constituted that it so adjusts the delay through the delay unit 12 that the voltage is zero at the output of the low pass filter 15.

The device according to FIG. 1 requires a delay unit 12 for continuous analogue voltages, which is difficult to produce. This difficulty can be overcome through time quantisation.

The quantisation is effected by sampling the voltages obtained from the converters 8 and 9 at constant time intervals $T_a$. The resultant amplitude-modulated impulses can either be further processed as such or they can be converted into a digital form, in particular into a combination of binary values.

FIG. 6 shows a circuit with analogue/digital conversion and subsequent digital processing. The parts numbered 1 to 9 are formed in the same way and have the same significance as those in FIG. 1.

Two analogue/digital converters 48 and 49 are provided which sample the voltages obtained from the photo-electric converters 8 and 9 and convert them into digital, generally binarily expressed values appropriate to the instantaneous amplitude of the voltage sampled. Reference numerals 50 and 51 represent two digital filters, the functions of which correspond to the filters 18 and 19, and which are described in detail later.

A shift register 52 is provided which delays the digital signals received from the filter 50 in series or parallel form and passes them on to the multiplier 54. The shift register 52 is further connected through a continuous impulse sequence which is fed to it through the lead 53. The time T which a code word requires in order to pass from the input of the shift register to its output is dependant upon the frequency $f = 1/T_a$ of the impulses obtained in the lead 53 and the length of the shift register. Thus the shift register fulfills the function of the delay unit 12 with a variable delay.

Reference numeral 54 represents a multiplication circuit which multiplies the value obtained at the output of the shift register 52 with the value obtained at the output of the digital filter 51. Such a multiplication is effected for all values which appear simultaneously at the output of the shift register 52 and at the output of the filter 51.

In the circuit according to FIG. 6, a low pass filter 55 for discrete values, for example a digital low pass filter, provides a signal at its output, one cycle of which is shown in FIG. 3 in relation to the delay $\tau$ and for a predetermined value of $T$. Reference numeral 56 represents a pulse generator the frequency of which is raised with a positive value at the output of the digital filter integrator 55 and is lowered with a negative value at this point.

Shift register 52, multiplier 54, filter integrator 55 and pulse generator control circuit 56 together constitute a regulator circuit in which the frequency of the pulse generator is so adjusted that the delay time $\tau$ becomes equal to the travel time $T$.

The control circuit 56 is also described in detail in the application referred to. The position of the filter 50 and the shift register 52 can naturally be exchanged.

As already mentioned, it is necessary for the discrete case that the z-transformed impulse response $H_1$ (z) and $H_2$ (z) respectively of the two filters satisfy the following equation:

$$H_1(z) \cdot H_2(1/z) = -H_1(1/z) \cdot H_2(z) \qquad (2)$$

A pair of filters that satisfies this condition is shown in FIGS. 8 and 9. The equations are satisfied:

$$Y_1(k) = q\, Y_1(k-1) + X_1(k-1) + X_1(k) \qquad (16)$$
$$Y_2(k) = q[Y_2(k-1) - X_2(k-1) + X_2(k)] \qquad (17)$$

in which the values identified with 1 are related to the first and the values identified with 2 are related to the second filter.

$X(k)$ identifies the $k$-th value at the inputs of the filters, $X(k-1)$ the preceding input values. $Y(k)$ and $Y(k-1)$ correspondingly identify the current and preceding output values respectively. Two values, the $k$ of which differ by a value $m$, appear at the same point with a time interval of $m \cdot T_a$.

A first filter of a pair of filters for discrete values according to the first of these equations is shown in FIG. 8. The input 60 is connected with a delay circuit 61 which delays the value $X_1(k)$ by $T_a$. An input of an addition circuit or adder 62 is connected to its output. A second input of this circuit collects the input signal $X_1(k)$. The output of the addition circuit delivers the output signal that is retarded in the delay circuit 63 by the amount $T_a$ and then multiplied in the circuit 64 by a constant $q$ and led to a third input of the addition circuit 62.

FIG. 9 shows the second filter of the pair of filters: The value $X_2(k)$ of the input 70 is retarded in the delay circuit 71 by a time $T_a$, multiplied by $-1$ and led to an input of the addition circuit or adder 72. A second input of this circuit is connected with the input 70. The output of the addition circuit is multiplied by a $q$ in the circuit 73 and then retarded by the time $T_a$ in the delay circuit 74. The output of the circuit 73 delivers the value $Y_2(k)$ while the value $Y_2(k-1)$ leaves the output of the delay circuit 74. This is fed back to a third input of the adder circuit 72.

The outputs of the filters can also be connected to the outputs of the delay circuits 63 and 74, and then appear one cycle later than with the connections shown.

It has been assumed in the foregoing description that the sampling circuits 48 and 49 contain analogue/digital converters and that the further processing of the values is effected in a digital form. In this treatment the binary combinations which illustrate the signals can appear in a known manner either in parallel on a number of wires or in series on one wire. The sampling circuits 48 and 49 can however also yield amplitude-modulated impulses, which are further processed as such.

Finally it is possible for the filters shown in FIGS. 4 and 5 to be arranged for continuous values and to be placed in the circuits before the sampling devices 48 and 49, as is shown in FIG. 7, which illustrates a fragmentary section from FIG. 6 in another arrangement. It is in particular to be emphasised that the filters described in detail each constitute only one pair of suitable filters, but that there are several pairs of filters which satisfy the general equations introduced.

With the method and the device described it is possible for the body (the measurement device) to be fixed and the surface, for example the surface of a material track, in particular rolled goods, to be moving. Conversely the body can be moved, for example be a vehicle with a speedometer, and the surface remain still, for example the running surface of a railway, or be a surface along which a vehicle runs with or without wheels, for example a hover-vehicle or craft.

What is claimed is:

1. A device for the measurement of the speed of a body which is moved parallel to a surface, which has a local irregular feature, comprising one leading and one trailing converter means spaced above the surface to produce two sequences of electrical signals which correspond with the feature of the surface at two points running together with the body, said leading and trailing converter means being spaced one from the other in the direction of movement, a delay unit with an adjustable delay for the signals emanating from the leading converter means, a multiplier circuit for the multiplication of the delayed signals of the leading converter means by the undelayed signals of the trailing converter means, a low pass filter connected to the output of the multiplier circuit, a control circuit connected to said low pass filter for the adjustment of the delay of said delay unit in dependence of the output of said multiplier circuit to a value which corresponds to a timely coincidence of the delayed and undelayed signals, and at least one indicating device, which on the adjusted basis of the delay of the delay circuit and the spacing of the points indicates the relative velocity and/or the path travelled onward from a given point, two filters, each interposed in the connection between one of said converter means and the multiplier circuit, and the said filters having different frequency characteristics which are so chosen that the value obtained at the output of the low pass filter is zero, when the delayed signal and the undelayed signal timely coincide, said control circuit adjusting the delay of the delay unit so that the output of said multiplier circuit is zero.

2. A device as set forth in claim 1, wherein said converter means produce continuous voltages and the frequency characteristics of said filters are so chosen that the Fourier transformations $H_1(\omega)$ and $H_2(\omega)$ respectively of the impulse response to an infinitely narrow input pulse of the two filters satisfy the following equation:

$$\overline{H_1}(\omega) \cdot H_2(\omega) = -\overline{H_1}(-\omega) \cdot H_2(-\omega)$$

in which $\overline{H_1}$ identifies the conjugate complex value of $\overline{H_1}$ and $\omega$ is the angular frequency.

3. A device as claimed in claim 2, wherein the Fourier transformation of the impulse response of one of the two filters is $$H_1(\omega) = 1/1 + j\omega RC$$

and of the other of the two filters is $$H_2(\omega) = j\omega RC/1 + j\omega RC$$

wherein $RC$ is a time constant.

4. A device as set forth in claim 3, wherein each of said two filters contains an inverting operational amplifier the output of which is connected with the filter output, one filter having a first resistor connected between the input of the filter and the input of said amplifier, and a second resistor and a first capacitor in parallel with one another and connected between the input and the output of said amplifier, the other filter having a third resistor and a second capacitor in series between the input of the filter and the input of said amplifier, and a fourth resistor connected between the input and the output of said amplifier.

5. A device as set forth in claim 1, including first and second sampling means interposed respectively in the connection between one of said converter means and one of said filters for producing an impulse sequence with an impulse frequency $f = 1/T_a$ and corresponding to the amplitudes of the signals emanating from the converter means, and said filters are arranged for discrete values, of which the z-transforms $H_1(z)$ and $H_2(z)$ respectively of the impulse response are so selected that $H_1(z) \cdot H_2(1/z) = H_1(1/z) \cdot H_2(z)$ in which $z = e^{-sT_a}$ and $s$ signifies the quantity $\sigma + j\omega$ of the Laplace transformation.

6. A device as claimed in claim 5, wherein the value $Y_1(k)$ is yielded from the first filter at any instant and is determined by the equation $Y_1(k) = qY_1(k-1) + X_1(k-1) + X_1(k)$ and the value $Y_2(k)$ is yielded by the second filter at the same instant and is determined by the equation $Y_2(k) = q[Y_2(k-1) - X_2(k-1) + X_2(k)]$, in which $y_1$ and $Y_2$ respectively signify the values of the input signal, $X_1$ and $X_2$ respectively the value of the output signal, and $q$ a factor $<1$, while $k-1$ and $k$ relate to two instants spaced by the time $T_a$.

7. A device as claimed in claim 5, wherein the delay unit is a shift register.

* * * * *